(12) United States Patent
Wu

(10) Patent No.: US 9,936,503 B2
(45) Date of Patent: Apr. 3, 2018

(54) METHOD AND DEVICE FOR DETERMINING WLAN CHANNEL

(71) Applicant: Telefonaktiebolaget L M Ericsson (publ), Stockholm (SE)

(72) Inventor: Yi Wu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 14/890,063

(22) PCT Filed: May 9, 2013

(86) PCT No.: PCT/CN2013/075391
§ 371 (c)(1),
(2) Date: Nov. 9, 2015

(87) PCT Pub. No.: WO2014/179961
PCT Pub. Date: Nov. 13, 2014

(65) Prior Publication Data
US 2016/0113015 A1    Apr. 21, 2016

(51) Int. Cl.
*H04W 72/04* (2009.01)
*H04W 36/06* (2009.01)
(Continued)

(52) U.S. Cl.
CPC ....... *H04W 72/0453* (2013.01); *H04W 36/06* (2013.01); *H04W 72/0486* (2013.01);
(Continued)

(58) Field of Classification Search
None
See application file for complete search history.

(56) References Cited

U.S. PATENT DOCUMENTS

| 2008/0080433 A1* | 4/2008 | Cromer | H04W 72/06 370/338 |
| 2010/0091731 A1* | 4/2010 | Kim | H04W 16/14 370/329 |

(Continued)

FOREIGN PATENT DOCUMENTS

| CN | 102823285 A | 12/2012 |
| GB | 2495550 A | 4/2013 |

(Continued)

OTHER PUBLICATIONS

Unknown, Author, "White Paper of CMCC Nanocell Technology", China Mobile Research Institute, Version 1.0, Aug. 21, 2012, 1-20.

*Primary Examiner* — Christopher Grey
(74) *Attorney, Agent, or Firm* — Murphy, Bilak & Homiller, PLLC

(57) ABSTRACT

This disclosure provides a method and for determining WLAN channel in a base station which supports both WLAN access and cellular network access, and a first WLAN channel is allocated for its WLAN access. According to this disclosure, if frequency space between the first WLAN channel and frequency range occupied by the cellular network access is not larger than a threshold, the base station detects available WLAN channels which are not occupied by surrounding WLANs. If the frequency space between the available WLAN channels and the frequency range occupied by the cellular network is not larger than the threshold, the base station changes its WLAN channel from the first WLAN channel to a second WLAN channel occupied by one of the surrounding WLANs. The frequency space between the second WLAN channel and the frequency range occupied by the cellular network access is larger than (Continued)

the threshold, thus interference between the cellular network and the WLAN is reduced or eliminated. This disclosure also provides a base station.

14 Claims, 5 Drawing Sheets

(51) Int. Cl.
| | |
|---|---|
| *H04W 72/08* | (2009.01) |
| *H04W 88/10* | (2009.01) |
| *H04W 48/20* | (2009.01) |
| *H04W 84/04* | (2009.01) |
| *H04W 84/12* | (2009.01) |

(52) U.S. Cl.
CPC .......... *H04W 48/20* (2013.01); *H04W 72/082* (2013.01); *H04W 84/042* (2013.01); *H04W 84/12* (2013.01); *H04W 88/10* (2013.01)

(56) References Cited

U.S. PATENT DOCUMENTS

| | | |
|---|---|---|
| 2012/0231830 A1 | 9/2012 | Jeong et al. |
| 2012/0327850 A1 | 12/2012 | Wang et al. |
| 2013/0016635 A1 | 1/2013 | Linsky et al. |
| 2013/0072209 A1 | 3/2013 | Haartsen et al. |

FOREIGN PATENT DOCUMENTS

| | | |
|---|---|---|
| WO | 2010077318 A1 | 7/2010 |
| WO | 2012049351 A1 | 4/2012 |
| WO | 2012052791 A1 | 4/2012 |
| WO | 2013006199 A1 | 1/2013 |

\* cited by examiner

METHOD AND DEVICE FOR DETERMINING WLAN CHANNEL

TECHNICAL FIELD

The present invention generally relates to communication technology. More specifically, and in various embodiments, the present invention relates to method and device for determining WLAN channel.

BACKGROUND

Unless otherwise indicated herein, the approaches described in this section are not prior art to the claims in this disclosure and are not admitted to be prior art by inclusion in this section.

Available spectrum used by operators is limited and expensive. Radio link improvement is fast and is approaching its theoretical limit. The next leap of performance and capacity may come from network topology evolution by using a mix of macro cells and small cells, also referred to as Heterogeneous Network. Wireless Local Area Networks (WLANs), such as Wi-Fi (Wireless Fidelity) access, are also integrated into Heterogeneous Networks so as to improve user experience.

The business model for WLAN has changed from merely a home Internet gateway alternative to an essential part of the operator's bigger network data strategy. It would be advantageous for mobile operators to be able to offer packet based services to its customers over more networks such as WLAN than just its cellular networks.

Some operators are planning to deploy a system where LTE (Long Term Evolution) small cell and Wi-Fi AP (Access Point) is integrated. As shown in FIG. 1, the system includes a User Equipment (UE) 101, an integrated Base Station (BS) 102, a network Management System (NMS) 103, network management device 103, an Access controller (AC) 104 and a Wi-Fi AP 105. The integrated BS 102 provides LTE access and Wi-Fi access for UE 101. Wi-Fi AP 105 is a normal WLAN which is not integrated into LTE BS. The NMS 103 provides the management service both for the integrated BS 102 and the Wi-Fi AP 105. The AC 104 controls the Wi-Fi AP 105 in groups.

For a system where cellular network access and WLAN access are integrated into one BS, the inter-system radio interference may exist. For example, a TD-LTE small cell may use a frequency range of 2.3G-2.4 GHz for indoor coverage which is very close to a frequency band or range of 2.4G for Wi-Fi. Table 1 is a frequency list for Wi-Fi technology. Because of physically integration of some components, the adjacent frequency ranges may lead to serious radio interference in some scenarios.

TABLE 1

Frequency List of IEEE 802.11 family

| Protocol | Frequency | Throughput (Typical) | Data Rate (Max) | Modulation Technique |
|---|---|---|---|---|
| 802.11a | 5 GHz | 0-25 Mbps | 54 Mbps | OFDM |
| 802.11b | 2.4 GHz | 5 Mbps | 11 Mbps | DSSS -CCK |
| 802.11g | 2.4 GHz | 23 Mbps | 54 Mbps | OFDM & DSSS |
| 802.11n | 2.4 GHz 5 GHz | 50-144 Mbps | 600 Mbps | OFDM MIMO |

One possible solution to reduce the inter-system radio interference of the co-existence scenario is to increase the antenna isolation of the difference systems which is usually required to be more than several meters isolation in vertical direction. However, the antenna isolation solution has some limit in performance improvement and it is not easy to be deployed for the integrated BS.

A US patent application US20130072209A1 discloses a wireless communication device including a first radio frequency (RF) transceiver (i.e. Bluetooth transceiver), a second RF transceiver (i.e. Wi-Fi transceiver) and a connection manager. The first RF transceiver is configured to transmit/receive RF signals in a first frequency band, and the second RF transceiver is configured to transmit/receive RF signals in a second frequency band that may be different from the first frequency band. The connection manager is coupled to the first and second RF transceivers and assists with channel selection by the first and second RF transceivers to reduce mutual interference between the first and second RF transceivers. The communication device here is a UE, just interference inside the UE is considered, and different UEs served by a same BS may have different channels or frequency bands, thus this solution can not solve the interference at the integrated BS side.

Another US patent application US20130016635A1 discloses a solution to mitigate potential interference between different radio access technologies (RATs) on a UE. According to this solution, traffic scheduling rules may be implemented so that communications of the individual RATs are timed in a manner that reduces interference. Another US patent application US20120327850A1 discloses a solution to reduce interference by controlling the timing of WLAN communications such that WLAN receptions do not overlap with transmissions of LTE. The two solutions are also for UE side, and can not efficiently solve the interference at the integrated BS side.

SUMMARY OF THE INVENTION

It is the object to obviate at least some of the above problems and provide an improved solution for determining WLAN channel in a base station which supports both cellular network access and WLAN access.

Aspects of the invention include a method for determining WLAN channel in a base station which supports both WLAN access and cellular network access, and a first WLAN channel is allocated for its WLAN access. The method comprises: detecting available WLAN channels which are not occupied by surrounding WLANs, if frequency space between the first WLAN channel and frequency range occupied by the cellular network access is not larger than a threshold; and changing WLAN channel of the base station from the first WLAN channel to a second WLAN channel occupied by one of the surrounding WLANs, if frequency space between each of the available WLAN channels and the frequency range occupied by the cellular network is not larger than the threshold. The frequency space between the second WLAN channel and the frequency range occupied by the cellular network access is larger than the threshold.

Aspects of the invention include a base station supporting both WLAN access and cellular network access. A first WLAN channel is allocated for its WLAN access. The base station comprises a detection unit and a channel change unit. The detection unit is configured to detect available WLAN channels which are not occupied by surrounding WLANs, if frequency space between the first WLAN channel and frequency range occupied by the cellular network access is not larger than a threshold. The channel change unit is configured to change WLAN channel of the base station from the first WLAN channel to a second WLAN channel occupied by one of the surrounding WLANs, if frequency space between each of the available WLAN channels and the frequency range occupied by the cellular network is not larger than the threshold. The frequency space between the second WLAN channel and the frequency range occupied by the cellular network access is larger than the threshold.

There also provides a computer program product adapted to carry out the method as described above when run on a computer.

There also provides another base station for determining WLAN channel. The base station comprises a processor and a memory. The memory contains instructions executable by the processor, and the base station is operative to execute the methods as described above.

According to aspects of this invention, if the frequency space between each of the available WLAN channels and the frequency range occupied by the cellular network is not larger than the threshold, which indicates a radio interference between cellular network and WLAN may exist, the base station changes its WLAN channel to a second WLAN channel occupied by one of the surrounding WLANs. For the second WLAN channel, the frequency space between it and the frequency range occupied by the cellular network access is larger than the threshold, thus the radio interference between cellular network and WLAN is reduced or eliminated. In addition, it is preferable that the surrounding WLAN occupying the second channel changes to the first channel, that is, the BS and the surrounding WLAN exchange their channels, thus the interference between WLANs are also reduced.

BRIEF DESCRIPTION OF THE DRAWINGS

The foregoing and other objects, features, and advantages of the invention will be apparent from the following more particular description of preferred embodiments as illustrated in the accompanying drawings.

DETAILED DESCRIPTION

Figure 1:
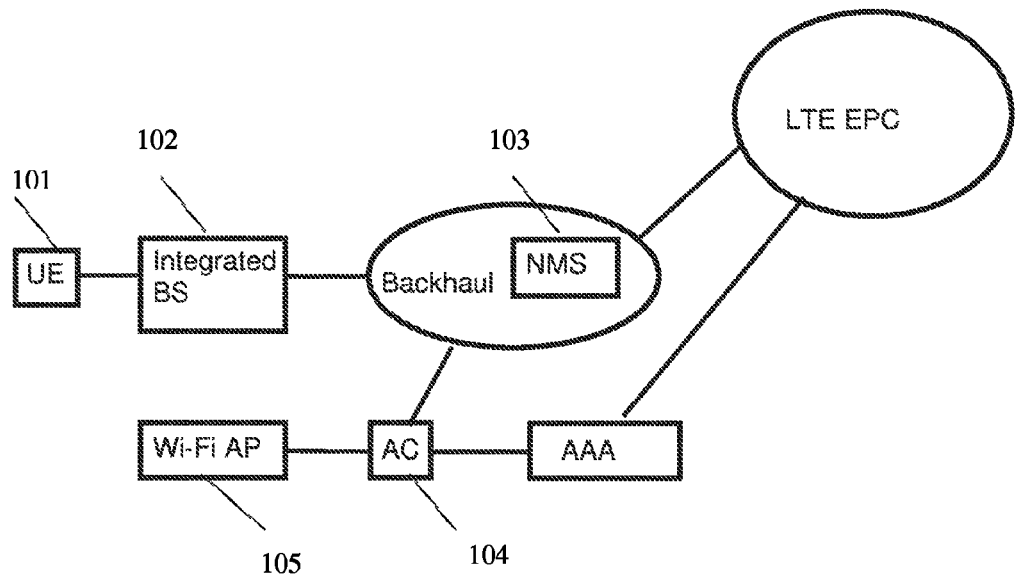
FIG. 1 shows a schematic structure for a system where cellular network access and WLAN access are integrated.

While the invention covers various modifications and alternative constructions, embodiments of the invention are shown in the drawings and will hereinafter be described in detail. However it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

The methods, as shown in the following drawings, can be implemented in form of software, hardware, firmware or the combination thereof.

Figure 2:
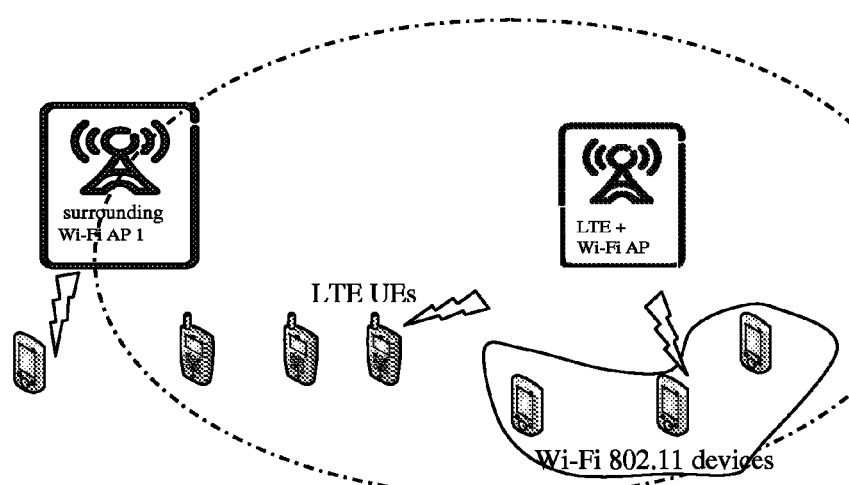
FIG. 2 shows interference between Wi-Fi access and LTE access.

Referring to FIG. 2, an example of the LTE and Wi-Fi inter-system interference has been shown. Because the antennas of the two systems have to be very close to each other or even the two systems share the same antennas, the inter-system radio interference may occur. The frequency range or band occupied by Wi-Fi is 2.4G. For LTE, the frequency bands close to 2.4 GHz include Band 40: 2.3G-2.4G (used for TD-LTE) and Band 7: 2.5G-2.57G (used for FDD-LTE uplink).

Theoretically speaking, the TD-LTE cell can normally work even if the Wi-Fi channel is close to its spectrum because at least there would be around 30 MHz space between TD-LTE and Wi-Fi frequency ranges. However, the interference may still exist because of radio leakage.

For LTE and Wi-Fi integrated BS, there is no time synchronization between LTE system and Wi-Fi system, and it will always happen that its LTE module is receiving while its Wi-Fi module is transmitting. The adjacent channel interference is mainly consisted of two factors: ACLR (Adjacent Channel Leakage Ratio) and ACS (Adjacent Channel Selectivity). The ACLR is a measure of out-band emissions which is the ratio of the filtered mean power centered on the assigned channel frequency to the mean power centered on the adjacent channel frequency. The ACS is a measure of receiver ability to receive a wanted signal at its assigned channel frequency in the presence of an adjacent channel signal. The LTE radio has a very high requirement for transmission and reception. However, the Wi-Fi radio is not. Correspondingly, the Wi-Fi radio would be an offender bringing adjacent radio interference to LTE receiver due to the bad ACLR. On the other hand, the Wi-Fi radio may also be a victim being suffered from the adjacent interference by LTE due to the bad ACS.

In a practical trial system, the high inter-system interference between the TD-LTE cell at 2.37 GHz and the WLAN at 2.412 GHz has been observed.

Figure 3:
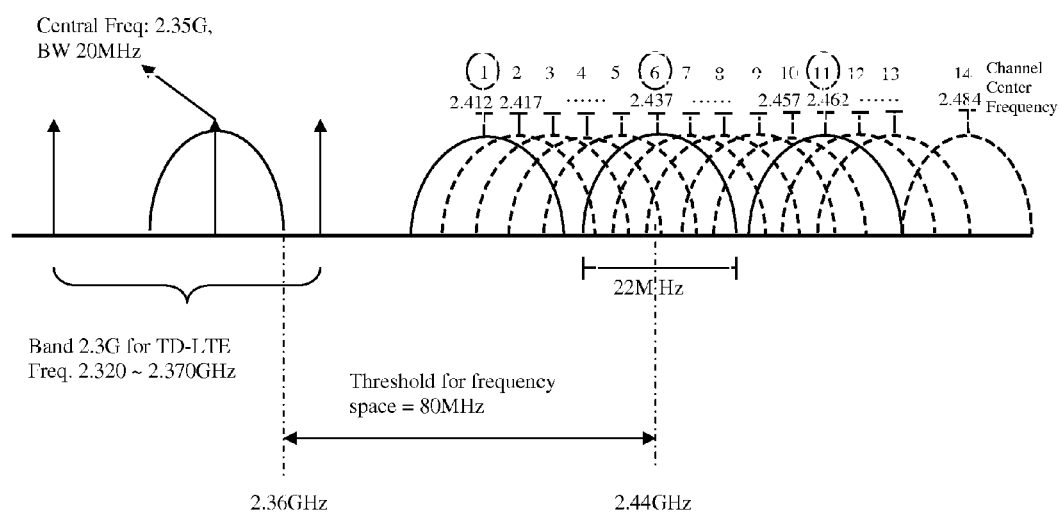
FIG. 3 shows frequency ranges of Wi-Fi and TD-LTE.

Referring to FIG. 3, the designed frequency band for TD-LTE is 2.3G band from 2.320 to 2.370 GHz, and the designed frequency band for Wi-Fi is 2.4G band from 2.412 GHz to 2.484 GHz. In this embodiment, the frequency range occupied by TD-LTE is 20 MHz band width with the central frequency of 2.35 GHz, that is, from the lower end 2.34 GHz to the higher end 2.36 GHz. For WLAN, there could be 14 WLAN channels in 2.4G band, from Channel 1 to Channel 14, as showed in FIG. 3. However, Channel 14 may be only allowed in Japan, and Channel 12 and 13 may be not allowed in US. It can be seen that some channels overlap. One popular method is that only the non-overlapped WLAN channels (Channel 1, 6, and 11) could be selected and all the other channels are not preferred due to the overlapping. In this embodiment, this method is used, so only Channel 1, 6 and 11 can be used for Wi-Fi.

When an integrated BS starts up with the TD-LTE frequency range from 2.34 GHz to 2.36 GHz, The integrated BS, usually performed by its Wi-Fi module, will automatically allocate a first WLAN channel. The algorithm for allocating the first WLAN channel may be different. For example, it may allocate a predetermined channel, or allocate the channel used in the last time. In this embodiment, the Channel 1 is allocated as the first WLAN channel.

Figure 4:
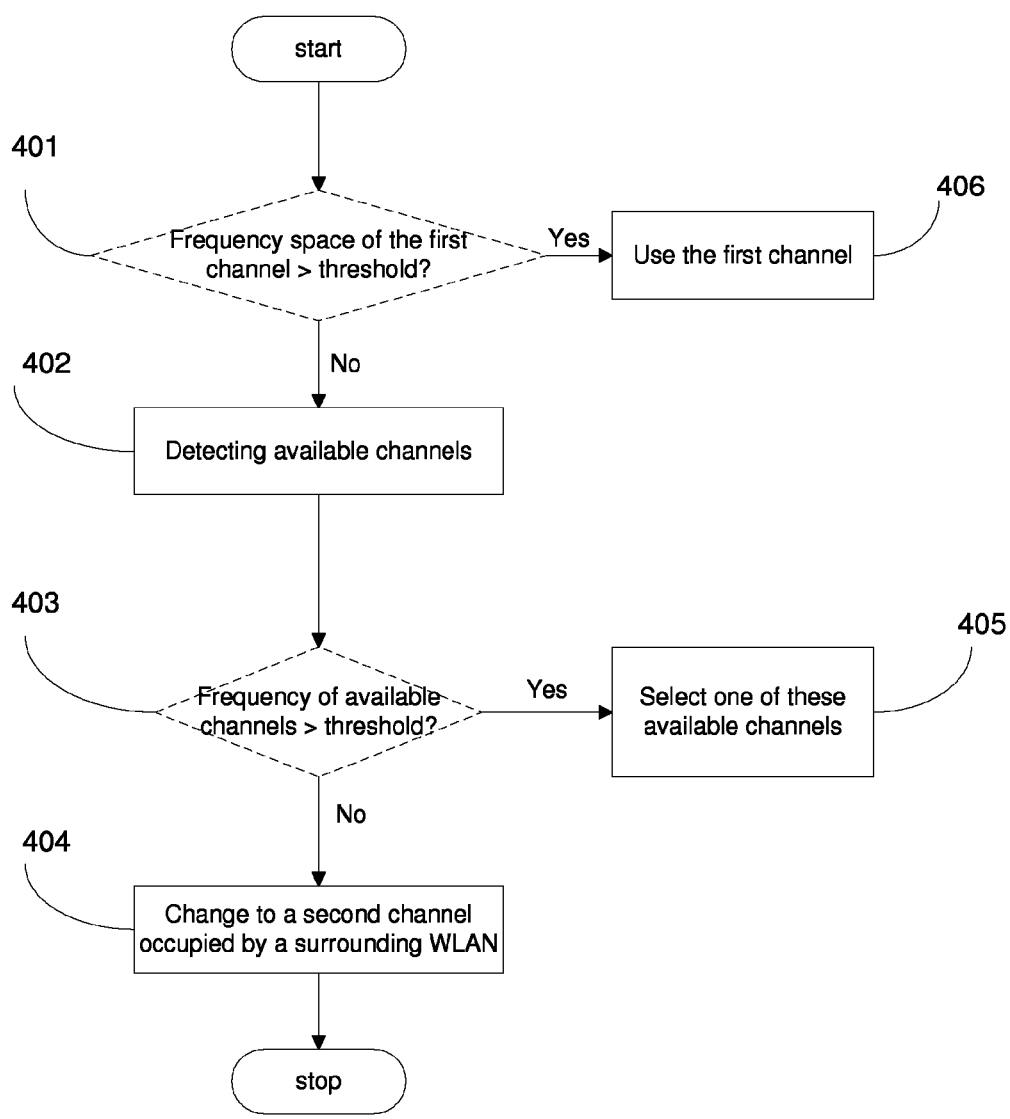
FIG. 4 is a flowchart illustrating steps of one embodiment according to method of this invention.

After the integrated BS starts up and the first WLAN channel has been allocated, if the frequency space between the first channel and the frequency range occupied by the cellular network access is not larger than a threshold, the BS will detect available channels which are not occupied by surrounding WLANs. As shown in FIG. 3 and FIG. 4, the frequency range occupied by TD-LTE is from 2.34 GHz to 2.36 GHz, the threshold is 80 MHz, and the frequency space between them is not larger than 80 MHz. The frequency space usually means the frequency difference between the two closest ends of the two frequency ranges. In FIG. 3, it is the difference between the higher end of TD-LTE frequency range and the lower end of channel 1. The frequency space may also be indicated by a function of central frequency of two frequency ranges. The threshold can be predetermined based on pre-test and verification at product level. Optionally and preferably, the BS determines whether the frequency space is larger than the threshold by making a comparison (Block 401). If not, the BS detects the available channels (Block 402). If yes, the BS uses the first channel (Block 406). The comparison may be executed by other node and inform the BS of the result.

Optionally and preferably, the BS determines if the frequency space between any of the available channels and the frequency range occupied by TD-LTE is larger than the threshold (Block 403). In this embodiment, Channel 6 and Channel 11 have been occupied by two surrounding Wi-Fi networks, so no available channels exist and of course no available channels with frequency space larger than the threshold. If there is one or more available channels are detected, but all of them have the frequency space not larger than the threshold, or if no available channels exist, the BS changes its WLAN channels from the first channel to a second channel (Block 404). The second channel is selected from channels occupied by the surrounding Wi-Fi networks and the frequency space between the second channel and the frequency range occupied by TD-LTE should be larger than the threshold. As shown in FIG. 3, Channel 6 and Channel 11 are occupied by the surrounding Wi-Fi networks, but only Channel 11 has the frequency space larger than the threshold, so Channel 11 is selected as the second channel. If more than one channels occupied by the surrounding Wi-Fi networks have the frequency space larger than the threshold, one of them will be selected. The channel with the largest frequency space may be selected as the second channel. The second channel may also be selected by random, or in other methods. Preferably, the selection of the second WLAN channel can be based on the user load of the WLAN. In order to reduce the impact of channel change on users served by a Wi-Fi network, it is preferred to select the one with lowest user load, such as lowest amount of users. The selection may be done by a network management device which has the user load information, such as NMS 103 in FIG. 1. The selection may also be done by the BS which has obtained user load information from the NMS or other nodes.

If at least one of available channels has the frequency space larger than the threshold, the BS selects one of them as the second channel (Block 405) and changes to the second channel. It may select the channel with the largest frequency space, or by random, or in other methods.

For the surrounding WLAN occupying the second channel, it is preferred that it change to the first channel, because it will also efficiently reduce interference between WLANs in the meantime of reducing interference between WLAN and cellular network. In this case, the BS need inform this surrounding WLAN the information about the first WLAN channel. The BS may inform this surrounding WLAN directly via interface between WLANs, or through a NMS.

The BS may change to the second channel without confirmation from the NMS or the surrounding WLAN. The BS may also change to the second channel after receiving confirmation from the NMS or the surrounding WLAN, as shown in FIG. 5.

Figure 5:
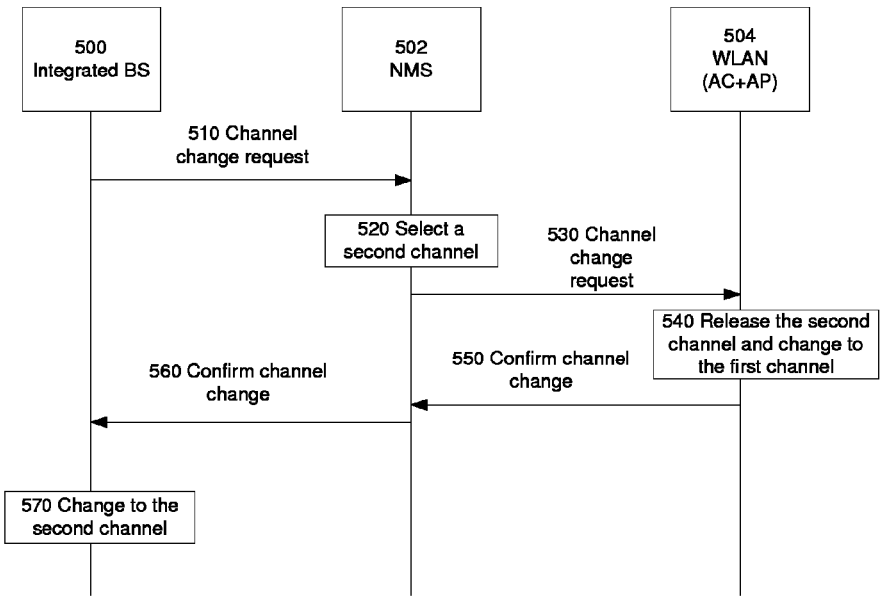
FIG. 5 is a flowchart illustrating steps of another embodiment according to method of this invention.

Referring to FIG. 5, if an integrated BS 500 wants to change its channel from a first channel to a second channel occupied by a surrounding WLAN 504, it may send a channel change request to a NMS 502 at step 510, the channel change request may include the information about the first channel and the second channel. At step 520, the NMS 502 will select the second channel for the BS 500, and then send a channel change request to the WLAN 504 which occupies the second channel at step 530. At step 540, the WLAN 504 will release the second channel and change to the first channel. The WLAN 504 may change to other channel other than the first channel. At step 550, a confirmation message is sent to the NMS 502 and then be forwarded to BS 500. At step 570, the BS 500 changes to the second channel after receiving the confirmation message.

Figure 6:
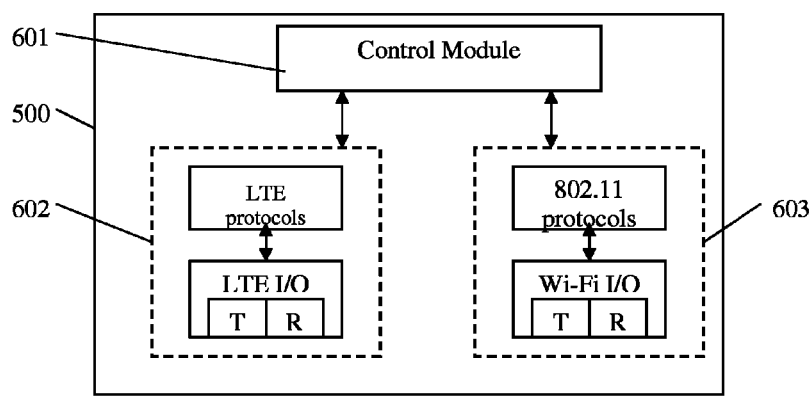
FIG. 6 is a block diagram illustrating one embodiment according to apparatus of this invention.

FIG. 6 shows a block diagram of base station 500 according to one embodiment of this disclosure. As shown in FIG. 5, the base station 500 comprises a Control Module 601, a LTE Module 602 and a Wi-Fi Module 603. The Control Module is configured to control the Wi-Fi Module 603 to change its channel from a first channel to a second channel if the frequency space between the first channel and the frequency range occupied by the LTE is not larger than a threshold.

Figure 7:
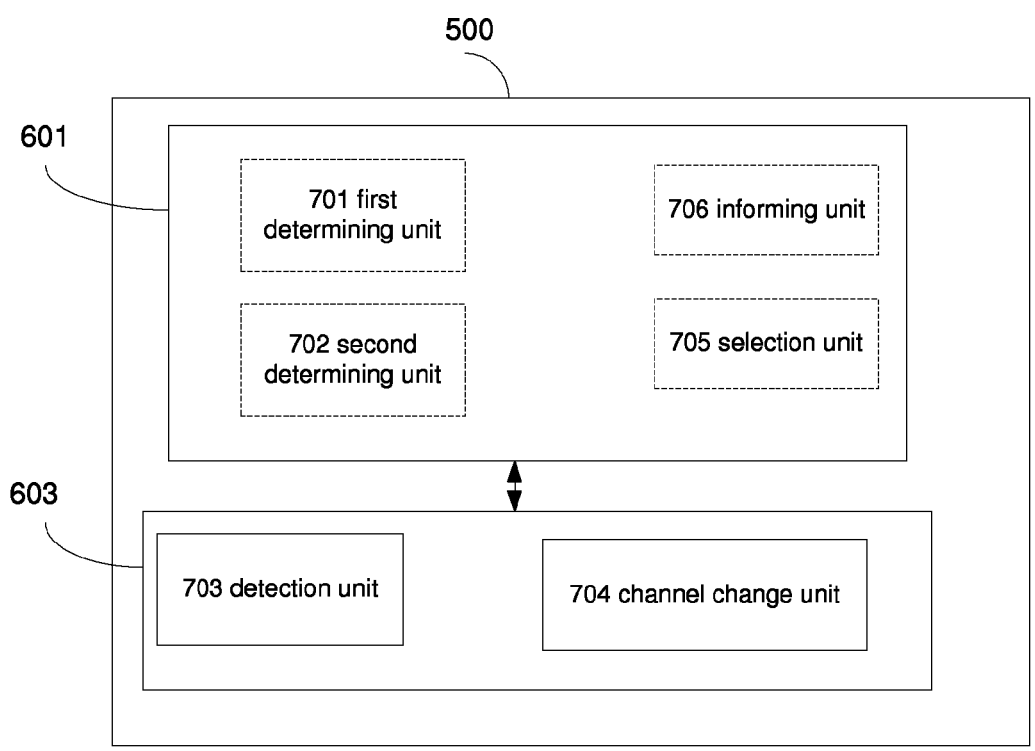
FIG. 7 is a block diagram illustrating another embodiment according to apparatus of this invention.

FIG. 7 shows a block diagram of base station 500 according to another embodiment of this disclosure. As shown in FIG. 7, the base station 500 comprises a detection unit 703 and a channel change unit 704. The detection unit 703 is configured to detect available WLAN channels which are not occupied by surrounding WLANs, if frequency space between the first WLAN channel and frequency range occupied by the cellular network access is not larger than a threshold. The channel change unit is configured to change WLAN channel of the base station from the first WLAN channel to a second WLAN channel occupied by one of the surrounding WLANs, if frequency space between each of the available WLAN channels and the frequency range occupied by the cellular network is not larger than the threshold. The frequency space between the second WLAN channel and the frequency range occupied by the cellular network access is larger than the threshold. If two or more WLAN channels occupied by the surrounding WLANs have the frequency space larger than the threshold, select one of them as the second channel. Preferably, the second channel is selected based on the user load.

The base station 500 may further comprise a first determining unit 701. The first determining unit 701 is configured to determine whether the frequency space between the first WLAN channel and the frequency range occupied by the cellular network access is larger than the threshold, before the detection unit detects the available WLAN channels.

The base station 500 may further comprise a second determining unit 702. The second determining unit 702 is configured to determine whether the frequency space between any of the available WLAN channels and the frequency range occupied by the cellular network access is larger than the threshold, before the channel change unit changes its channel from the first channel to the second channel.

The base station 500 may further comprise a selection unit 705. If the frequency space between at least one channel of the available WLAN channels and the frequency range occupied by the cellular network is larger than the threshold, the selection unit 705 is configured to select one of the at least one WLAN channel as the second WLAN channel. Optionally, when there are two or more WLAN channels occupied by the surrounding WLANs have the frequency space larger than the threshold and the selection is done by the base station instead of NMS, the selection unit 705 may be further configured to select the second WLAN channel from the two or more WLAN channels based on user load.

The base station 500 may further comprise an informing unit 706. The informing unit 706 is configured to inform the surrounding WLAN occupying the second WLAN channel the information about the first WLAN channel, such that the surrounding WLAN changes its WLAN channel from the second channel to the first channel.

In another embodiment, a base station for determining WLAN channel comprises a processor and a memory. The memory contains instructions executable by the processor, whereby the base station is operative to execute any of the methods or steps as described in the embodiments above.

Some of the above units may be combined or located in a same module. For example, the detection unit 703 and the channel change unit 704 may be located in the Wi-Fi Module 603. The first determining unit 701 and second determining unit 702 may be combined as one determining unit. The informing unit 706 and the selection unit may be located in the Control Module 601.

It should be noted that this invention is generally applicable to scenarios where WLAN access and cellular network access are integrated into a base station, and not limited to scenario of co-existence between Wi-Fi and TD-LTE. The cellular network may be GSM, WCDMA, WIMAX (Worldwide Interoperability for Microwave Access) and LTE (TD-LTE and FDD-LTE). The WLAN includes but is not limited to Wi-Fi, WAPI (Wireless LAN Authentication and Privacy Infrastructure) and the like. The base station in this invention may have different names in different scenarios. For example, it is called eNodeB in LTE network. The UE in this disclosure can be any kind of terminals having connectivity with the base station, including but not limited to cellular phones, mobile phones, PDAs, portable computers and the like.

It should also be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of first, second, and reference number for steps or blocks do not represent any order.

What is claimed is:

1. A method for determining WLAN channel in a base station, wherein the base station supports both WLAN access and cellular network access, and a first WLAN channel is allocated for the base station's WLAN access, the method comprising:
   detecting available WLAN channels that are not occupied by surrounding WLANs, in response to a determination that frequency space between the first WLAN channel and frequency range occupied by the cellular network access is not larger than a threshold;
   changing WLAN channel of the base station from the first WLAN channel to a second WLAN channel occupied by one of the surrounding WLANs, in response to a determination that frequency space between each of the available WLAN channels and the frequency range occupied by the cellular network access is not larger than the threshold, wherein frequency space between the second WLAN channel and the frequency range occupied by the cellular network access is larger than the threshold.

2. The method of claim 1, wherein if frequency space between two or more WLAN channels occupied by the surrounding WLANs and the frequency range occupied by the cellular network access is larger than the threshold, the second WLAN channel is selected from said two or more WLAN channels based on user load.

3. The method of claim 2, wherein a WLAN channel having the lowest user load is
   selected as the second WLAN channel.

4. The method of claim 1, further comprising:
   determining whether the frequency space between the first WLAN channel and the frequency range occupied by the cellular network access is larger than the threshold, the step of determining being performed before the step of detecting.

5. The method of claim 1, further comprising:
   determining whether the frequency space between any of the available WLAN channels and the frequency range occupied by the cellular network access is larger than the threshold, the step of determining being performed before the step of changing.

6. The method of claim 1, further comprising:
   if the frequency space between at least one WLAN channel of the available WLAN
   channels and the frequency range occupied by the cellular network is larger than the threshold, selecting one of said at least one WLAN channel as the second WLAN channel.

7. The method of claim 1, further comprising:
   informing the surrounding WLAN occupying the second WLAN channel the information about the first WLAN channel, the surrounding WLAN changing its WLAN channel from the second WLAN channel to the first WLAN channel.

8. A base station supporting both WLAN access and cellular network access, and a first WLAN channel being allocated for its WLAN access, the base station comprising a processing circuit and a memory circuit, the memory circuit storing program instructions executable by the processing circuit and configured to cause the base station, when the program instructions are executed by the processing circuit, to:
   detect available WLAN channels which are not occupied by surrounding WLANs, in response to a determination that frequency space between the first WLAN channel and frequency range occupied by the cellular network access is not larger than a threshold; and
   change WLAN channel of the base station from the first WLAN channel to a second
   WLAN channel occupied by one of the surrounding WLANs, in response to a determination that frequency space between each of the available WLAN channels and the frequency range occupied by the cellular network is not larger than the threshold, wherein frequency space between the second WLAN channel and the frequency range occupied by the cellular network access is larger than the threshold.

9. The base station of claim 8, wherein the program instructions are configured so that, if frequency space between two or more WLAN channels occupied by the surrounding WLANs and the frequency range occupied by the cellular network access is larger than the threshold, the program instructions cause the base station to select the second WLAN channel from said two or more WLAN channels based on user load.

10. The base station of claim 8, wherein the program instructions are configured so that the program instructions cause the base station to select a WLAN channel having the lowest user load as the second WLAN channel.

11. The base station of claim 8, wherein the program instructions are configured so that the program instructions cause the base station to determine whether the frequency space between the first WLAN channel and the frequency range occupied by the cellular network access is larger than the threshold, before detecting the available WLAN channels.

12. The base station of claim 8, wherein the program instructions are configured so that the program instructions cause the base station to determine whether the frequency space between any of the available WLAN channels and the frequency range occupied by the cellular network access is larger than the threshold, before changing WLAN channel of the base station from the first WLAN channel to the second WLAN channel.

13. The base station of claim 8, wherein the program instructions are configured so that the program instructions cause the base station to, if the frequency space between at least one WLAN channel of the available WLAN channels and the frequency range occupied by the cellular network is larger than the threshold, select one of said at least one WLAN channel as the second WLAN channel.

14. The base station of claim 8, wherein the program instructions are configured so that the program instructions cause the base station to inform the surrounding WLAN occupying the second WLAN channel the information about the first WLAN channel, the surrounding WLAN changing its WLAN channel from the second WLAN channel to the first WLAN channel.

\* \* \* \* \*